May 3, 1960
B. F. ROBINSON
2,935,229
GASOLINE SALES RECORDING DEVICE
Filed April 29, 1958
3 Sheets-Sheet 1
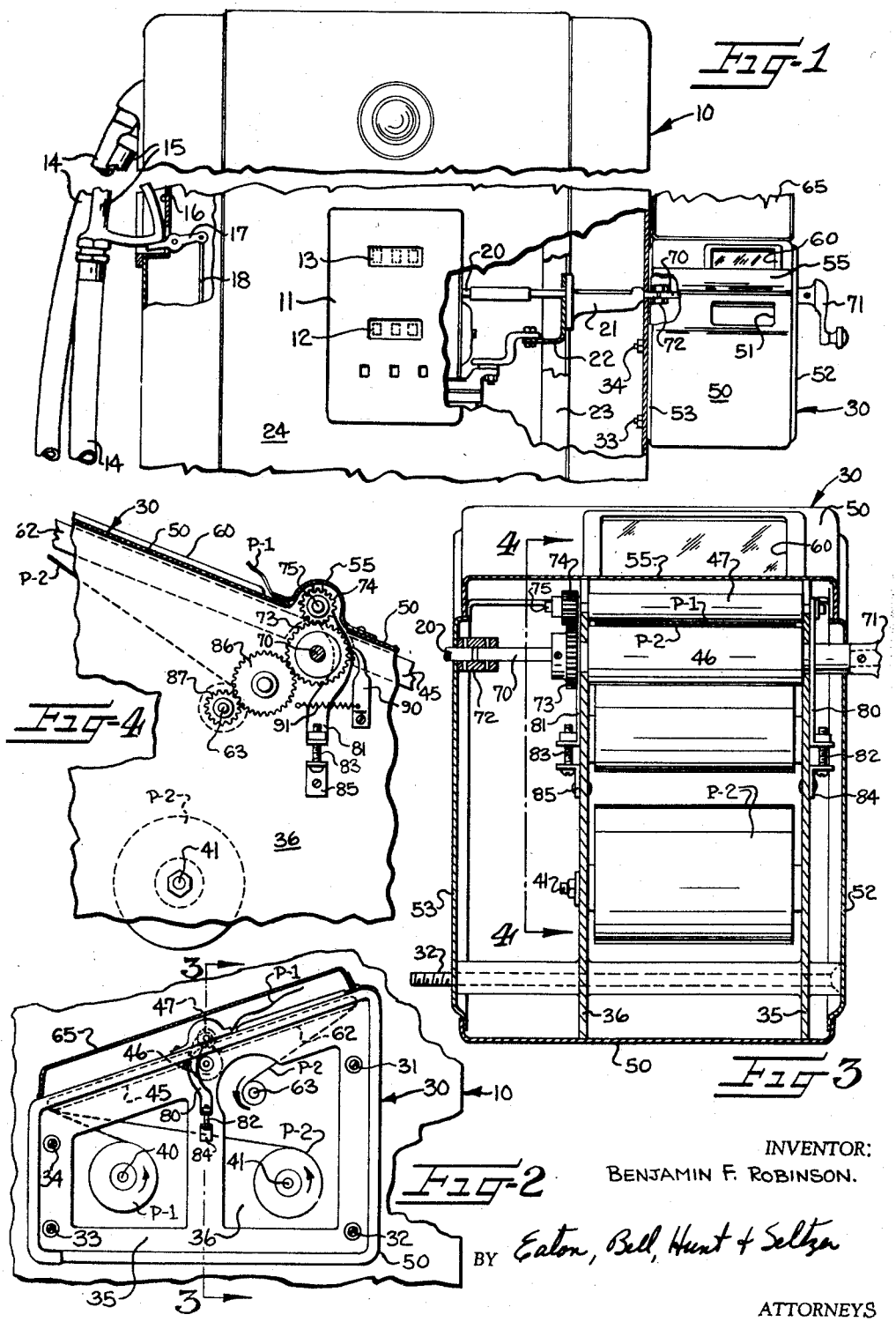
INVENTOR:
BENJAMIN F. ROBINSON.
BY Eaton, Bell, Hunt & Seltzer
ATTORNEYS May 3, 1960 B. F. ROBINSON 2,935,229
GASOLINE SALES RECORDING DEVICE
Filed April 29, 1958 3 Sheets-Sheet 2
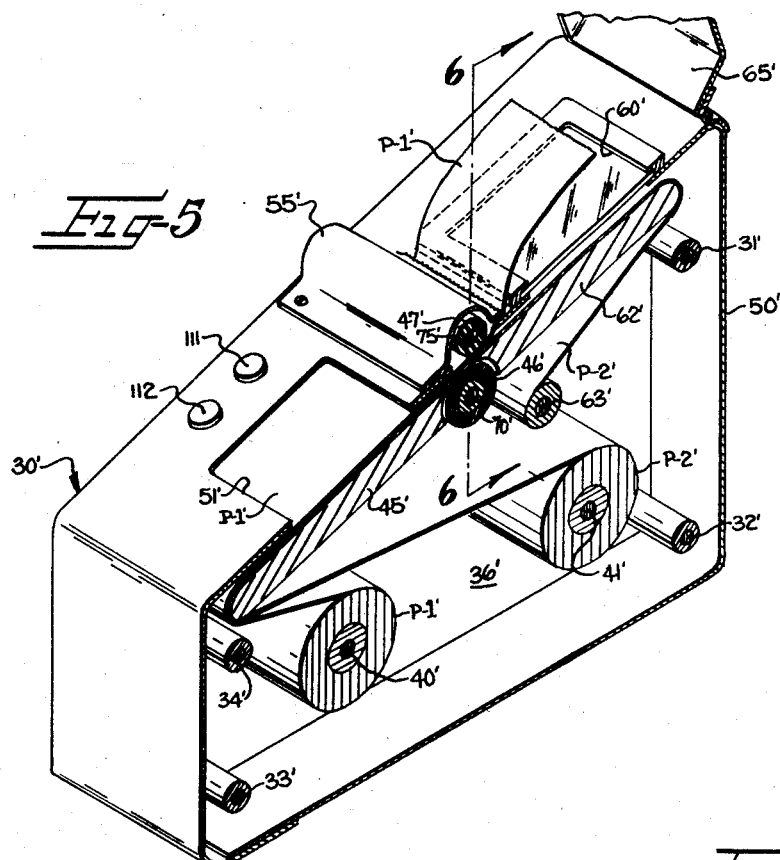
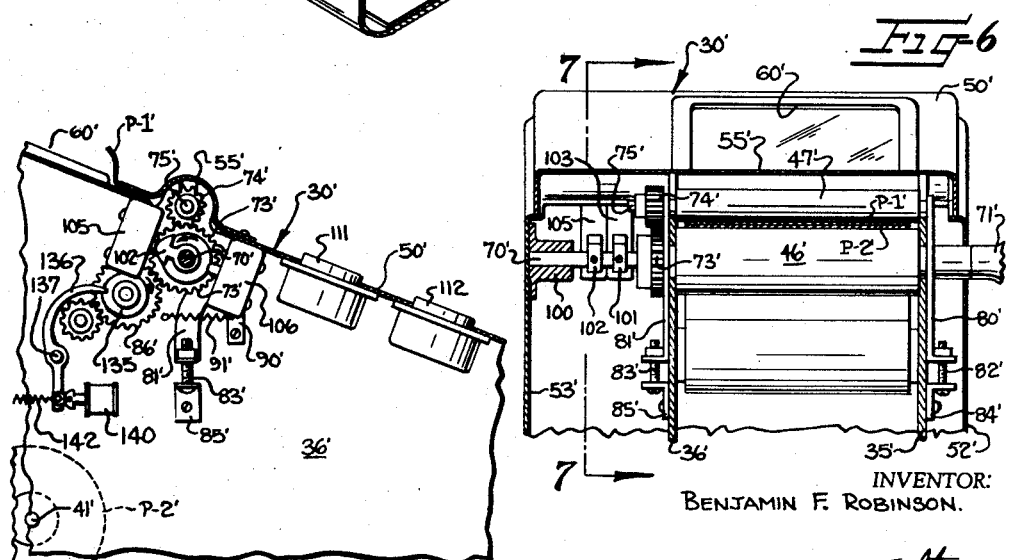
INVENTOR:
BENJAMIN F. ROBINSON.
BY Eaton, Bell, Hunt & Seltzer
ATTORNEYS May 3, 1960  B. F. ROBINSON  2,935,229
GASOLINE SALES RECORDING DEVICE
Filed April 29, 1958  3 Sheets-Sheet 3
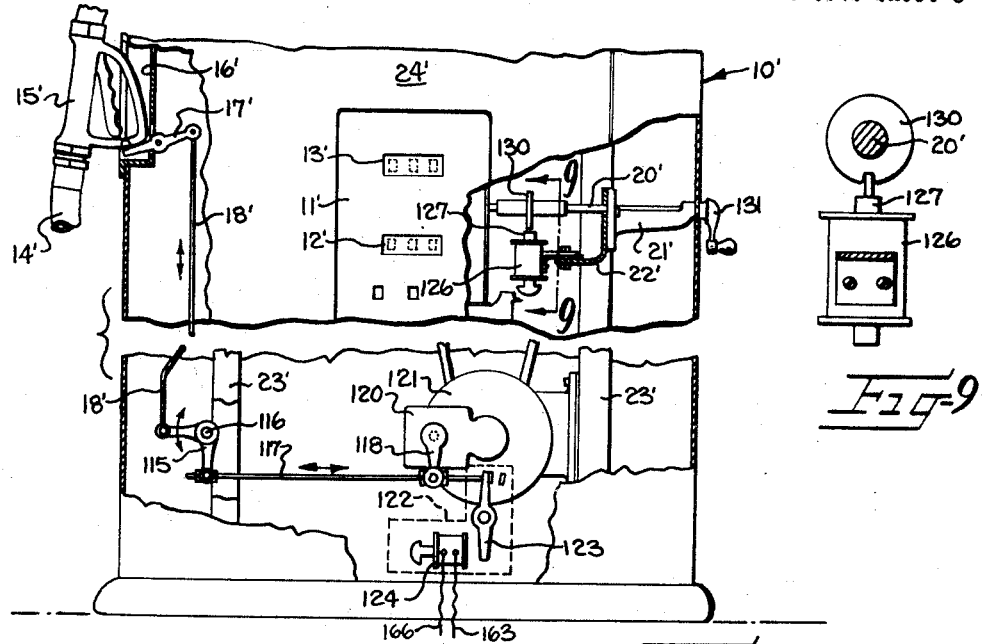
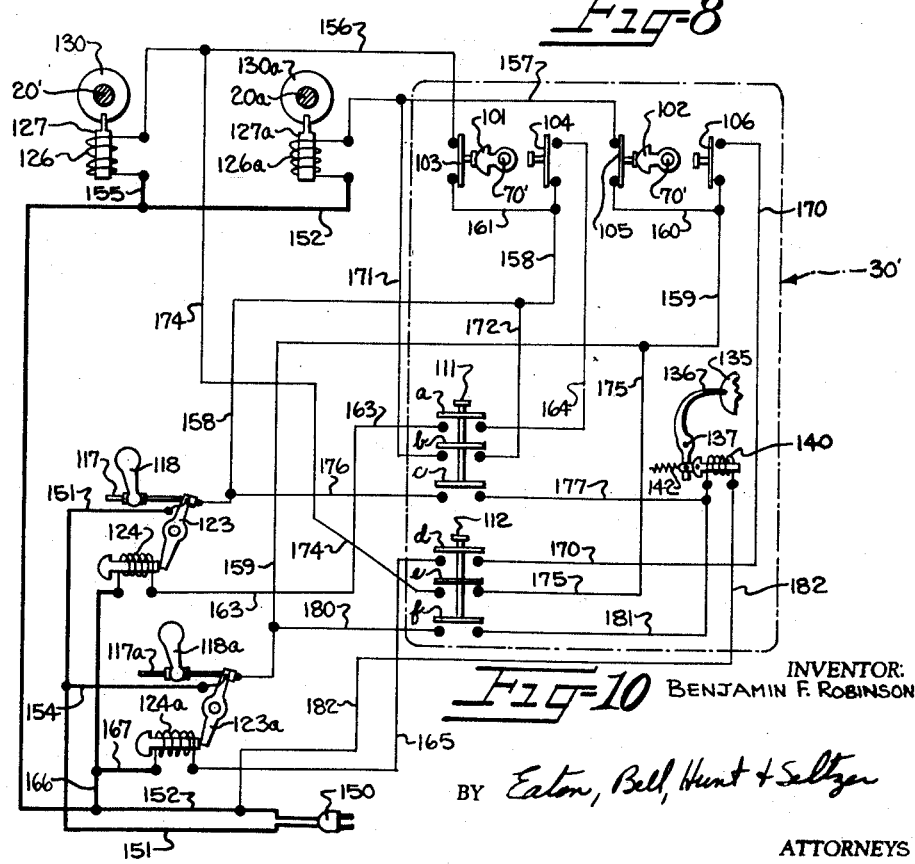
INVENTOR:
BENJAMIN F. ROBINSON.
BY Eaton, Bell, Hunt & Seltzer
ATTORNEYS

United States Patent Office 2,935,229
Patented May 3, 1960

2,935,229

GASOLINE SALES RECORDING DEVICE

Benjamin F. Robinson, Clover, S.C.

Application April 29, 1958, Serial No. 731,761

7 Claims. (Cl. 222—30)

The gasoline sales recording device of this invention is particularly adapted for use with a gasoline dispensing pump or the like and the device may be operatively connected directly to the pump or remote from the same in such a manner that the gasoline pump is locked after each pumping operation until the sales recording device is actuated to clear or unlock the pump.

As is well known, present dispensing pumps are provided with a recording meter which indicates the number of gallons dispensed as well as the amount to be charged for the gallons dispensed. After the pump has been operated, the volume of gasoline dispensed and the charge for the same indicated by the meter must be removed by resetting the meter before the pump can again be operated. This feature has been incorporated in pumps primarily to insure that the meter is repositioned at zero before dispensing additional gasoline to a second customer. This insures that each customer has received the total amount of gasoline indicated by the meter and that part of this total was not placed in a previous customer's car.

When an attendant has finished dispensing gasoline from a pump of the type described, it is desirable for him to immediately note the amount of gasoline dispensed and either collect the proper payment for this amount from the customer or make a charge ticket for the same. In many cases, however, the attendant is otherwise occupied, such as when the customer wants his oil checked, windshield wiped or other services. In the meantime, another attendant may reset the meter before the first attendant has made a note of the amount of gasoline dispensed and the charge for the same in order to dispense gasoline from the same pump to another customer. Once the meter has been reset, there is no way of determining the previous figures recorded on the meter. This occurrence is rather common and causes many discrepancies when an attempt is made to check the volume of business done, usually at the end of the day. In service stations where the attendants may not be too reliable or responsible, these discrepancies caused by failing to note and mark down the amount of gasoline dispensed at each dispensing operation generally take the form of shortages resulting in unusually high losses to the owners of the service stations.

With the foregoing in mind, it is the primary object of this invention to provide a sales recording device which is operatively attached to and controls the resetting operation of the meter on the gasoline dispensing pump in such a manner that the sales recording device must be actuated in order to reset the meter on the gasoline pump preparatory to a subsequent dispensing operation. Thus, the sales recording device acts as a remainder to the attendant that the amount registered on the gasoline meter must be recorded before the dispensing pump is again used.

It is another object of this invention to provide a sales recording device which is operatively connected to the dispensing pump and which is provided with means for recording and maintaining a permanent record of each sale made from the gasoline dispensing pump connected thereto.

It is another object of this invention to provide a sales recording device which may be easily connected to individual gasoline dispensing pumps, of the type presently available in filling stations and the like, with a minimum modification of the pump.

It is another object of this invention to provide a sales recording device which may be attached directly to a gasoline dispensing pump and which device may also be easily modified to be positioned at a remote point from the gasoline dispensing pump and operatively connected to several pumps for controlling the resetting operation of each of the pumps.

Some of the objects of the invention having been stated, other objects will appear as the description proceeds when taken in connection with the accompanying drawings, in which:

Figure 1 is a front elevation, with parts in section, showing the upper portion of a gasoline dispensing pump and with parts broken away to illustrate the manner in which the sales recording device is attached thereto;

Figure 2 is a fragmentary elevation looking at the left-hand side of Figure 1 and showing the recording device with its side cover removed and the protective cover in cross-section;

Figure 3 is an enlarged vertical transverse sectional view through the sales recording device taken substantially along the line 3—3 in Figure 2;

Figure 4 is a fragmentary vertical sectional view taken substantially along the line 4—4 in Figure 3 but with the protective cover in raised position;

Figure 5 is an isometric view of a modified form of the sales recording device, partially in cross-section, to illustrate the receipt dispensing and record storage features of the device;

Figure 6 is an enlarged vertical sectional view taken substantially along the line 6—6 in Figure 5;

Figure 7 is a fragmentary vertical sectional view taken substantially along the line 7—7 in Figure 6;

Figure 8 is a front elevation of a conventional gasoline dispensing pump with the central portion thereof and parts of the cover plate broken away to illustrate the manner in which the modified form of the sales recording device is operatively connected to the operating elements of the dispensing pump;

Figure 9 is an enlarged vertical sectional view taken substantially along the line 9—9 in Figure 8;

Figure 10 is a schematic wiring diagram illustrating the manner in which the sales recording device is operatively connected to the operating elements of a pair of gasoline dispensing pumps.

Referring to the drawings, the numeral 10 broadly designates a conventional gasoline dispensing pump of the type usually found in filling stations. The pump 10 includes a meter or registering box 11 with numerical dials 12 and 13 adapted to measure the quantity of gasoline delivered and the amount to be charged the customer, respectively. The pump 10 is also provided with a dispensing hose 14 connected at one end to the pumping mechanism of the pump, not shown, and having a dispensing nozzle 15 at its other end adapted to be hung, at times, in a receptacle or slot 16 in one side of the pump 10. The nozzle 15 is adapted to rest upon a trip lever 17 positioned in the lower portion of the receptacle 16. The trip lever 17 is pivoted intermediate its ends and the inner end is connected to the upper end of a vertically extending control link 18 which is suitably connected to the pumping mechanism of the pump 10 in such a manner that when the outer end of the trip lever 17 is raised, the link 18 will start the pumping mechanism to build up pressure in the hose 14 and dispense gasoline when the nozzle is opened.

The meter 11 is provided with means for resetting the same to reposition the dials 12 and 13 to zero after each pumping operation. This resetting means includes a shaft 20 (Figure 1), the inner end of which is connected to the meter 11 and the opposite end of which is supported in a bearing bracket support 21 suitably secured to a transverse frame member 22 supported at opposite ends on vertical frame members 23 of the pump 10. The pump 10 is provided with a suitable relatively thin sheet metal cover 24 which is fastened to the vertical frame members 23 in a conventional manner and through which one end of the shaft 20 normally extends. In conventional pumps, a crank handle is mounted on the end of the shaft 20 adjacent the cover 24 to provide means for manually rotating the shaft 20 to reset the meter 11 after the pumping operation.

In order to insure that the meter 11 is reset or returned to zero prior to each pumping or dispensing operation, all conventional gasoline pumps, such as the type illustrated, are provided with conventional safety means whereby the meter 11 must be reset before the pump motor will operate to dispense gasoline through the hose 14 and nozzle 15. This safety mechanism is tied in with the pump motor circuit in a conventional manner and therefore will not be described in detail, it being deemed sufficient to merely describe its operation.

As heretofore stated, the trip lever 17 normally operates the motor to start the pump 10 when its outer end is raised after removing the nozzle 15. However, unless the meter 11 has been returned to zero or reset, the pump will not start operating even though the outer end of the trip lever 17 is raised. This is a conventional feature of practically all gasoline dispensing pumps now available and was developed primarily to prevent an attendant from putting gasoline in one car, then putting additional gasoline in a second car and charging the second customer for the gasoline dispensed both times.

With the pumps now in general use, the previous pumping operation record must be removed from the meter 11 before pumping a second time. While this feature is certainly desirable and necessary to prevent a second customer from being charged for gasoline received by a previous customer, this also has a disadvantage. In many instances, an attendant will reset the meter 11 in order to pump gas for another customer without making a note of the amount on the meter 11 before he resets the same. This frequently proves to be a costly mistake to filling station owners, particularly if the amount removed from the meter 11 has not been collected.

The recording device of the present invention acts as a reminder to the attendant that he should record the amount on the meter 11 before resetting the same. In the first modification, shown in Figures 1–4, the recording device is indicated broadly at 30 and is attached directly to the cover 24 of the pump 10. The recording device 30 is held or supported on the side of the pump 10 by suitable screws 31, 32, 33 and 34 (Figure 2) which also support, in spaced apart relationship, an open frame member 35 and a solid frame member 36.

A pair of stub shafts 40 and 41 support a pair of rolls of paper tape indicated at P-1 and P-2 respectively. The paper tapes are led over a first platen 45 (Figure 2) in superposed position and between a pair of driven feed rolls 46 and 57 disposed above and below the paper tapes. The rolls 46 and 47 are mounted for rotation at opposite ends in the frame members 35 and 36. The rolls 46 and 47 are preferably resilient and may be rubber-covered rolls. The manner in which they are driven will be later described. The housing of the recording device 30 comprises a relatively thin sheet metal shell or cover 50 which extends completely around the recording device 30 and has an opening 51 in the upper surface thereof beneath which the paper tapes P-1 and P-2 pass when pulled from the rolls by the driven rolls 46 and 47 in a manner to be later described. Sheet metal sides 52 and 53 are held in position at opposite sides of the device 30 by the cover 50 (Figure 3).

It is preferable to provide the paper tape P-1 with a suitable carbon backing so that when this paper is written on as it is positioned in the opening 51 in the cover 50, an impression will be transferred to the paper tape P-2 therebeneath.

The roll 47 is disposed above the level of the cover 50 and is provided with a cover plate 55 extending above the same and connected to the upper surface of the cover 50. The cover plate 55 has a serrated opening therein through which the upper paper tape P-1 is led as the paper tapes are moved by the rolls 46 and 47. The upper surface of the cover 50 is also provided with a second opening which is covered by a glass panel or the like, indicated at 60 and which is positioned in longitudinal alinement with the path of travel of the paper tape P-2 as it is supported and travels along a second platen 62 supported at opposite sides on the frame members 35 and 36. As the paper tape P-2 leaves the rounded end of the platen 62, it extends to and is taken up on a driven roll or shaft 63 mounted for rotation in the side frame or the frame member 36 (Figures 3 and 4).

If desired, the recording unit 30 may be provided with a hinged cover 65 to prevent rain, dust and the like from collecting or getting into the inside of the device 30 through the opening 51.

In order to move the paper tapes P-1 and P-2 forwardly for positioning the next blank beneath the opening 51, the roll 46 is fixed on a transversely extending shaft 70 rotatably mounted adjacent opposite ends of the roll 46 in the frame members 35 and 36. One end of the shaft 70 is provided with a handle 71 fixed thereto for manually rotating the shaft 70. The shaft 70 is suitably connected to the outer end of the reset shaft 20 by a suitable collar 72 (Figure 3). The shaft 70 is also provided with a gear 73 fixed thereon closely adjacent the frame member 36 and which mates with a gear 74 (Figures 3 and 4). The gear 74 is fixed to one end of a shaft 75 which penetrates the roll 47 and is fixed thereto, the shaft 75 being rotatably mounted adjacent opposite ends of the roll 47 in vertically elongated holes in the frame members 35 and 36. Adjustment of the roll 47 may be accomplished by vertically adjustable bearing members 80 and 81 the upper ends of which rotatably support the shaft 75 and the lower ends of which are adjustable vertically by adjustment screws 82 and 83. The lower ends of the adjustment screws 82 and 83 are secured to the respective frame members 35 and 36 by angle brackets 84 and 85 (Figures 2, 3 and 4).

Thus, when rotation is imparted to the shaft 70, by means of the handle 71, rotation will be imparted to the gear 73, gear 74 and shaft 75 to rotate the rolls 46 and 47 in opposite directions for pulling the paper tapes P-1 and P-2 between these rolls. The relative grip or traction on the paper tapes between the rolls 46 and 47 may be adjusted by the screws 82 and 83 to take care of various differences in paper weight, wear on the rolls, etc.

Referring to Figure 4, in particular, a gear 86 is rotatably mounted on the frame member 36 and engages the gear 73 as well as a gear 87 fixed on one end of the take-up shaft 63. Thus, with rotation of the handle 71, motion will be imparted to the rolls 46 and 47 to feed the paper tape P-1 through the serrated opening in the cover plate 55, as shown in Figure 5, while rotation will be imparted to the shaft 63 for taking up the duplicate paper tape P-2 and storing the same for reference. In order to prevent rotation of the rolls 46, 47 and the handle 71 in a reverse direction, a pawl 90 (Figure 4) is provided. The pawl 90 has one end oscillatably mounted on the frame member 36 and the other end of which is adapted to engage the teeth of the gear 73 in such a manner that the gear 73 will only rotate in one direction, counterclockwise as viewed in Figure 4. The pawl 90 is resiliently urged into engagement with the gear 73 by a tension spring 91, one end of which is suitably secured intermediate the ends of the pawl 90 and the other end of which is fixed on the frame member 36.

Assuming that the meter 11 has been reset so that the numbers read zero on both of the recording dials 12 and 13, the operating procedure will be as follows:

As the attendant removes the nozzle 15 from the pump 10 he raises the outer end of the trip lever 17 to actuate the pump motor so that the gasoline is forced under pressure through the hose 14 and to the nozzle 15. Of course, as heretofore stated, conventional safety or locking mechanisms in the pump 10 operate through the meter 11 so that unless the meter 11 is reset to zero, the movement of the trip lever 17 will have no effect on the pump motor. Thus, with gasoline under pressure in the hose 14, when the attendant pulls the trigger on the nozzle 15, after placing the nozzle 15 in the gasoline tank of an automobile or another receptacle, gasoline will be fed through the meter 11, hose 14 and into the tank or receptacle. The amount of gasoline dispensed is simultaneously registered on the dial 12 and the cost of the gasoline is registered on the dial 13. Of course, the gasoline may be cut off at any time by releasing pressure on the trigger of the nozzle 15. When the nozzle 15 is replaced in its receptacle 16, it will automatically lower the outer end of the trip lever 17 to thus cut off the pump 10. The pump 10 will not operate again until the meter 11 has been reset or until the dials 12, 13 have been returned to their zero position through conventional mechanism already described.

With the recording device 30 attached to the reset shaft 20, as illustrated in Figures 1-4, the crank handle 71 must be rotated in order to reset the meter 11. This rotation will automatically position the next ticket on the roll of paper P-1 in the opening 51 of the cover 50 for the recording device 30. Thus, it is important for the attendant to write down the amount of the sale as well as the number of gallons of gasoline dispensed before resetting the meter 11. The recording device 30 is positioned so that it must be actuated to reset the meter 11 and acts as a reminder to an attendant that he must note the amount on the meter 11 before resetting the same. In this way, every amount of gasoline dispensed will be recorded in duplicate on the paper tapes from rolls P-1 and P-2. If an attendant forgets or for any other reason fails to record the amount of gasoline registered on the meter 11 before resetting the same, a blank ticket will be dispensed from the recording device 30 and a duplicate blank will appear in the glass panel or window 60 so that the filling station owner may know that some attendant is not recording the amount dispensed from the pump 10 on the recording device 30 before resetting the meter 11.

In addition to providing a check on shortages attributed to resetting the gasoline pump meter 11 without recording the amount dispensed from the pump 10, the recording device 30 will dispense a ticket each time gasoline is dispensed and the handle 71 is turned so that where the sale is for cash, the ticket may be given to the customer as a receipt and where the sale is for credit, the ticket may be placed in the cash register or other place for a credit record.

In Figures 5-10, a modified form of recording device is shown which is particularly adapted to operate at a remote point from the gasoline pump 10 while still controlling the resetting of the meter 11 to prevent additional gasoline from being pumped through the pump 10 without the same being recorded on the recording device. Since the modified form of the recording device is substantially identical to the recording device shown in Figures 1-4, like parts will bear like reference characters with the prime notation added. This will apply to like parts of the pump also.

The recording device shown in Figures 5-10 may be connected to a single pump or may be connected to a plurality of pumps to control the operation of each of the pumps so that the amount appearing on the meter of any particular pump must be recorded before the pump can be reset. While only two gasoline pumps are shown as being controlled by the modified form of recording device (Figure 10), it is to be understood that additional pumps may also be controlled by the recording device by slight modification.

The modified form of recording device 30' may be positioned inside of the office of a filling station, or suitably mounted on the pump island near the pumps which it controls. The recording device 30' has an operating handle 71' (Figure 6), only a portion of which is shown, suitably secured to one end of the shaft 70'. The opposite end of the shaft 70' is suitably journaled or supported in a bearing member 100. It will be noted that the shaft 70' does not extend through the housing 50' as was the case in the first form of recording device 30.

The shaft 70' has a pair of actuating arms 101 and 102 (Figures 6 and 10) fixed thereon, the outer free ends of which are adapted to periodically engage and close respective normally open switches 103, 104 and 105, 106. It will be noted in Figures 6 and 7 that the switches 103 and 105 are mounted on one side of the shaft 70' and the switches 104 and 106 are mounted on the opposite side of the shaft 70'. The switches 103, 104 and 105, 106 have suitable electrical wires connected thereto which form a part of the electrical circuit, to be later described. The recording device 30' is also provided with suitable push-button type switches 111 and 112 suitably secured in the upper surface of the housing 50 and adjacent the recording opening 51'. The switches 111 and 112 are also provided with electrical wires forming a portion of the electrical circuit (Figure 10), to be later described.

In order to control the operation of a pump indicated at 10' in Figure 8, it is necessary that the pump be modified slightly so that the remote control recording device 30' may operate therewith. It will be noted in Figure 8 that the trip lever 17' has the upper end of a vertically extending control link 18' connected to its innermost end, the lower end of the link 18' being oscillatably mounted on one end of a bell crank 115. The bell crank 115 is oscillatably mounted as at 116 on the frame 23' of the pump 10'. The other end of the bell crank 115 has one end of a control link 117 oscillatably connected thereto. The opposite end of the control link 117 is oscillatably connected to the lower end of a switch arm 118.

The switch arm 118 controls the operation of an explosion-proof electrical switch 120 suitably connected to the control circuit of a pump motor 121. The link 117 extends beyond the switch arm 118 and is periodically adapted to operate an explosion-proof switch 122 which includes a switch arm 123 oscillatably mounted at its medial portion and periodically actuated by a solenoid 124 suitably housed in the switch 122.

An electrically operable solenoid 126 (Figures 8 and 9) is suitably mounted beneath the reset shaft 20' and has a plunger 127 which at times engages a locking wheel or cam 130 fixed to the shaft 20'. In this case, the conventional reset handle, indicated at 131, is fixed on the outer end of the reset shaft 20'.

Each pump which is connected to and controlled by the remote recording device 30' will be modified in an identical manner to that described for the pump 10' (Figures 8 and 9). Since parts of the two pumps are shown schematically in Figure 10, the parts of the second pump which are identical to the parts of the first pump will bear like reference characters with the small letter "a" affixed thereto. The second pump is also provided with a reset shaft 20a having a cam 130a fixed thereon and which is at times engaged by the plunger 127a of an electrically operable solenoid 126a (Figure 10). The switch arm 118a of the second pump is actuated by a link 117a which also actuates the switch arm 123a at times and at other times the switch arm 123a is actuated by an electric solenoid 124a.

In order to at times lock the handle 71' against rotation, the gear 86' is provided with a hub 135 which has a notch therein to at times receive one end of a locking pawl 136 (Figure 7). The locking pawl 136 is pivoted intermediate its ends as at 137 on the frame member 36' and its lower end is in close proximity to an electromagnet 140 suitably secured to the frame member 36'. The locking pawl 136 is normally urged into engagement with the hub portion 135 on the gear 86' by a tension spring 142, one end of which is suitably connected to the lower end of the locking pawl 136 and the opposite end of which is suitably fixed on the frame member 36'. The electromagnet 140 has suitable electric wires connected thereto which are a part of the wiring diagram (Figure 10), to be presently described.

*Wiring diagram*

The wiring diagram (Figure 10) includes a suitable male plug 150 which may be connected to any suitable source of electrical energy, not shown, and which has main lead wires 151 and 152 connected thereto. The other ends of wires 151 and 152 are connected to one side of the switch arm 123 and to one side of the solenoid 126a, respectively. The lead wire 151 has a branch wire 154 connected at one end thereof intermediate the ends of the wire 151. The other end of wire 154 is connected to one side of the switch arm 123a.

A branch wire 155 is connected at one end thereof intermediate the ends of the wire 152 and at its other end to one side of the solenoid 126. A wire 156 is connected at one end to the opposite side of the coil 126 and at its other end to one side of the switch 103. One end of a wire 157 is connected to one side of the solenoid 126a and the opposite end thereof is connected to one side of the switch 104. One end of a wire 158 is connected to one side of the switch arm 123 and the other end is connected to one side of the switch 104. One end of a wire 159 is connected to one side of the switch arm 123a and the other end is connected to one side of the switch 106. A wire 160 is connected at one end intermediate the ends of the wire 159 and at its other end to one side of the switch 105. A wire 161 is connected at one end intermediate the ends of the wire 158 and at its other end to one side of the switch 103.

One end of a wire 163 is connected to one side of the solenoid 124 and its other end is connected to the switch element a of the switch 111. A wire 164 is connected to the opposite side of the switch element a at one end and its opposite end is connected to one side of the switch 104. One end of a wire 165 is connected to one side of the solenoid 124a while the opposite side of the solenoid coil 124a is connected to an intermediate point on a branch wire 166 by a wire 167. The opposite end of the wire 165 is connected to one side of a switch element d of the switch 112. The ends of the branch wire 166 are connected to an intermediate point on wire 152 and to one side of the solenoid 124, respectively. A wire 170 is connected to the opposite side of the switch element d at one end and its opposite end is connected to one side of the switch 106.

One end of a wire 171 is connected intermediate the ends of the wire 157 and its opposite end is connected to one side of a switch element b of the switch 111, while the opposite side of the switch b is connected intermediate the ends of the wire 158 by a wire 172. One end of a wire 174 is connected intermediate the ends of the wire 156 and its opposite end is connected to one side of a switch element e of the switch 112, while the opposite side of the switch element e is connected intermediate the ends of the wire 159 by a wire 175. One end of a wire 176 is connected intermediate the ends of the wire 158 and its opposite end is connected to one side of the switch element c of the switch 111, while the opposite side of the switch element c is connected to one side of the electromagnet 140 by a wire 177.

One end of a wire 180 is connected intermediate the ends of the wire 159 and its opposite end is connected to the switch element f of the switch 112, while the opposite side of the switch element f is connected to one side of the electromagnet 140 by a wire 181. A wire 182 is connected at one end to one side of the electromagnet 140 and at its opposite end to a point intermediate the ends of the main lead wire 152.

Both of the pumps illustrated schematically in the wiring diagram shown in Figure 10 are in locked position, since both of the solenoid plungers 127 and 127a are in engagement with the notches in the cam wheels 130 and 130a to thus lock the respective resetting shafts 20' and 20a. This would indicate that the amounts registered on the meters of both of these pumps have not been recorded. Should an attendant attempt to turn the reset handle at either pump, it would be locked, thus reminding him that the amount must be recorded in order to clear the pump for a subsequent pumping operation. It is contemplated that the manually operable switches 111 and 112 will be marked with numbers corresponding to the numbers designated for the pumps so that either one of the pumps may be cleared or reset independently of the other.

As noted in Figures 7 and 10, it is necessary that one or the other of the buttons 111 and 112 be pushed before the handle 71' can be rotated, since the locking pawl 136 is normally urged into engagement with the hub 135 of the gear 86'. In order to release the locking pawl 136, it is necessary to energize the electromagnet 140 and this may be accomplished by pushing either of the buttons 111 and 112 and then rotating the handle 71' while holding the button in a downward or closed position.

Assuming that the amount registered on the No. 1 pump, or the pump controlled by the button 111, has been recorded and it is now desired to reset the meter thereon, the solenoid plunger 127 is moved out of the notch in the cam wheel 130 to release the reset shaft 20' by depressing the button 111 which will immediately complete an electrical circuit to the electromagnet 140 through the wire 151, contact point on the switch arm 123, wire 158, wire 176, switch element c, wire 177, electromagnet 140, wire 182 and wire 152. When the electromagnet 140 is energized, it will cause the locking pawl 136 to be moved slightly in a counterclockwise direction so that its upper locking end will move out of the notch in the hub 135 of the gear 86' and thus release or unlock the shaft 70' so that it may then be rotated by the crank handle 71'.

Of course, the switch levers 118 and 118a, shown in Figure 10, are in the position they would occupy when the pumps are in use and the nozzles thereof are not in their corresponding receptacles so that the outer ends of the corresponding switch levers are in an up or operative position. When either pump nozzle is hung up in its receptacle, the corresponding switch lever will be moved downwardly and the corresponding link 117 or 117a will move away from the corresponding switch lever 123 or 123a so that the latter element may then be moved in a counterclockwise direction to break the connection between corresponding wires 151, 158 or 154, 159.

With the button or switch 111 in depressed or closed position, the shaft 70' may be rotated to move both of the actuating arms 101 and 102 for actuating each of the switches 103—106 during rotation of the arms 101, 102. Thus, as the arm 101 moves past the switch 103 and the arm 102 moves past the switch 105 (the arms 101 and 102 rotating in a counterclockwise direction in Figure 10), the electric circuit to the solenoids 126 and 126a would normally be broken as soon as the respective switches 103 and 105 were opened. However, since the switch element b of the button or switch 111 is in a closed position, electric current can flow through wires 151, 158 and 172, switch element b, wire 171, wire 157, solenoid 126a and wire 152 to hold the circuit closed to the coil 126a so that only the electrical circuit to the coil 126 will be broken as the arm 101 moves past the switch 103.

In its rotation, the arm 101 will engage and close the switch 104 to complete an electric circuit through wire 151, the contact on the lever arm 123, wire 158, switch 104, wire 164, switch elements a of the switch 111, wire 163, coil 124, wire 166 and wire 152 to thus energize the coil 124 and move the switch arm 123 to the position indicated in Figure 8, thereby automatically breaking the circuit again. It follows that when the arm 101 makes a complete rotation through 360° and again closes the switch 103, the electrical circuit to the solenoid 126 will not be closed since the contact points at the upper end of the switch arm 123 will be spaced apart from each other to thus keep the plunger 127 of the solenoid 126 in a lowered position and the pump in unlocked position until it has again been used in a dispensing operation.

In order to clear the pump which is locked by the solenoid plunger 127a, the same procedure must be followed except that the opposite button or switch 112 must be manually depressed before rotating the handle 71'. When the button 112 is depressed, this will unlock the gear 86' so that rotation may be imparted to the handle 71', while simultaneously preventing the circuit to the coil 126 from being broken and breaking the circuit to the coil 126a to thus move the solenoid plunger 127a out of the notch in the wheel 130a so that the reset shaft 29a may be rotated to clear the meter on that pump preparatory to a subsequent pumping operation.

It is thus seen that there has been provided a recording device which, in both forms, requires that the recording device be actuated either before or simultaneously with the resetting of the meter of a gasoline pump. While there is no compulsion means provided to require an attendant to record the amount of gasoline dispensed before resetting the pump, this recording device will make detection of errors more apparent since a duplicate sales slip or record of sale will be visible in the window 60 following each resetting of the meter or actuation of the recording device.

The sales recording device 30, attached directly to a gasoline pump, shown in Figures 1–4, or the remote recording device 30' operatively connected to a single pump or plurality of pumps and positioned at a remote spot from the pumps, shown in Figures 5–9, may be connected to their respective pumps with a minimum amount of change or modification to the pumps. Both of these recording devices will operate to lock a pump after each pumping operation until they are actuated, thus providing an additional reminder that the amount of gasoline dispensed should be recorded before the meter on the pump which designates the amount dispensed is reset to zero. If the amount is not recorded, of course, it is lost to the service station operator, resulting in subsequent shortages at the end of each day, a problem which has long perplexed service station operators.

Thus, the sales recording device embodying this invention will act as a reminder to the attendant of a gasoline dispensing pump that the amount dispensed at each operation of the pump should be recorded before a subsequent pumping operation, while additionally providing means for keeping a permanent record of the amount dispensed at each pumping operation and providing a receipt for the customer.

In the drawings and specification there have been set forth preferred embodiments of the invention and, although specific terms are employed, they are used in a generic and descriptive sense only and not for purposes of limitation, the scope of the invention being defined in the claims.

I claim:

1. In combination with a gasoline dispensing pump of the type having gasoline dispensing means, metering means operatively connected to said dispensing means to visibly indicate the amount and cost of gasoline dispensed, means connected to said metering means for resetting said metering means following each pumping operation, and means to prevent operation of said dispensing means prior to operation of said reset means, the combination therewith of electrically operable locking means operable to lock said resetting means following each pumping operation, a sales recording device comprising manually operable actuating means, and electric switch means operable upon actuation of said sales recording device to unlock said locking means whereby said reset means may be operated.

2. In combination with a gasoline dispensing pump of the type having gasoline dispensing means, metering means operatively connected to said dispensing means to visibly indicate the amount and cost of gasoline dispensed, means connected to said metering means for resetting said metering means following each pumping operation, and means to prevent operation of said dispensing means prior to operation of said reset means, the combination therewith of electrically operable locking means operable to lock said resetting means following each pumping operation, a sales recording device comprising manually operable actuating means, sales slip positioning means to successively position duplicate sales slips in a position whereby the amount of gasoline dispensed may be recorded thereon following each actuation of said recording device, and electric switch means operable upon actuation of said sales recording device to unlock said locking means whereby said reset means may be operated.

3. In combination with a gasoline dispensing pump of the type having gasoline dispensing means, metering means operatively connected to said dispensing means to visibly indicate the amount and cost of gasoline dispensed, means connected to said metering means for resetting said metering means following each pumping operation, and means to prevent operation of said dispensing means prior to operation of said reset means, the combination therewith of electrically operable locking means operable to lock said resetting means following each pumping operation, a sales recording device positioned remotely from said gasoline dispensing pump, said sales recording device comprising manually operable actuating means, sales slip positioning means to successively position duplicate sales slips in a position whereby the amount of gasoline dispensed may be recorded thereon following each actuation of said recording device, and electric switch means operable upon actuation of said sales recording device to unlock said locking means whereby said reset means may be operated.

4. In combination with a gasoline dispensing pump of the type having gasoline dispensing means, meter means operatively connected to said dispensing means for visibly indicating the amount and cost of gasoline dispensed by said pump during each pumping operation, manually operable reset means connected to said meter means for resetting said meter means following each pumping operation, and means to prevent operation of said dispensing means prior to operation of said reset means; electrically operable locking means operatively engageable with said reset means, said locking means being operable to lock said reset means following operation of said dispensing means, a sales recording device positioned remotely from said gasoline pump and on which the amount and cost of gasoline indicated on said meter means may be recorded following each pumping operation, manually operable means to actuate said sales recording device, electrical switch means operable upon actuation of said sales recording device, and an electrical circuit connecting said switch means and said locking means to release said locking means upon actuation of said sales recording device.

5. An apparatus adapted to control the operation of a plurality of gasoline dispensing pumps, each of said pumps being of the type having gasoline dispensing means, metering means operatively connected to said dispensing means to visibly indicate the amount and cost of gasoline dispensed, and manually operable reset means connected to said metering means for resetting the same following each pumping operation; the combination therewith of locking means on each pump, said locking means being operatively engageable with the reset means of its corresponding pump, and a single sales recording device operatively connected to the locking means of each pump to prevent operation of the reset means prior to operation of said sales recording device.

6. An apparatus adapted to control the operation of a plurality of gasoline dispensing pumps, each of said pumps being of the type having gasoline dispensing means, metering means operatively connected to said dispensing means to visibly indicate the amount and cost of gasoline dispensed, and manually operable reset means connected to said metering means for resetting the same following each pumping operation; the combination therewith of electrically operable locking means on each pump, said locking means being operatively engageable with the reset means of its corresponding pump, a single sales recording device comprising means to record the amount and cost of gasoline indicated on the metering means of each pump, an electrical circuit connecting said sales recording device with each of said electrically operable locking means, manually operable means to actuate said sales recording device, electrical switch means corresponding in number to the number of gasoline dispensing pumps, and manually operable means to actuate said sales recording device to operate said electrical switch means and release said locking means.

7. An apparatus adapted to control the operation of a plurality of gasoline dispensing pumps, each of said pumps being of the type having gasoline dispensing means, metering means operatively connected to said dispensing means to visibly indicate the amount and cost of gasoline dispensed, and manually operable reset means connected to said metering means for resetting the same following each pumping operation; the combination therewith of electrically operable locking means on each pump, said locking means being operatively engageable with the reset means of its corresponding pump, a single sales recording device comprising means to record the amount and cost of gasoline indicated on the metering means of each pump, manually operable means to actuate said sales recording device, first electrical switch means corresponding in number to the number of pumps, said first electrical switch means being operable to control actuation of said sales recording device, manually operable means to actuate said sales recording device following the operation of said first electrical switch means, and second electrical switch means operable upon actuation of said sales recording device to release the locking means on the gasoline pump corresponding to the corresponding one of said first electrical switch means operated.

References Cited in the file of this patent

UNITED STATES PATENTS

| | | |
|---|---|---|
| Re. 14,586 | Batdorf | Jan. 14, 1919 |
| 1,875,119 | Ohmer et al. | Aug. 30, 1932 |
| 2,086,363 | McMullen | July 6, 1937 |
| 2,327,584 | Goldenberg | Aug. 24, 1943 |
| 2,354,249 | Eickmeyer et al. | July 25, 1944 |
| 2,554,296 | Crews | May 22, 1951 |
| 2,612,428 | Vroom | Sept. 30, 1952 |
| 2,792,148 | Goldenberg | May 14, 1957 |